US012451142B2

(12) United States Patent
Chao et al.

(10) Patent No.: US 12,451,142 B2
(45) Date of Patent: Oct. 21, 2025

(54) NON-WAKE WORD INVOCATION OF AN AUTOMATED ASSISTANT FROM CERTAIN UTTERANCES RELATED TO DISPLAY CONTENT

(71) Applicant: GOOGLE LLC, Mountain View, CA (US)

(72) Inventors: Pu-sen Chao, Los Altos, CA (US); Alex Fandrianto, Los Gatos, CA (US); Muhammad Umair, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 223 days.

(21) Appl. No.: 17/876,156

(22) Filed: Jul. 28, 2022

(65) Prior Publication Data

US 2024/0038246 A1    Feb. 1, 2024

(51) Int. Cl.
| | |
|---|---|
| *G10L 17/22* | (2013.01) |
| *G06F 3/0481* | (2022.01) |
| *G06F 3/16* | (2006.01) |
| *G10L 13/02* | (2013.01) |
| *G10L 17/06* | (2013.01) |
| *G10L 15/22* | (2006.01) |

(52) U.S. Cl.
CPC ............ *G10L 17/22* (2013.01); *G06F 3/0481* (2013.01); *G06F 3/167* (2013.01); *G10L 13/02* (2013.01); *G10L 17/06* (2013.01); *G10L 2015/223* (2013.01)

(58) Field of Classification Search
CPC ......... G10L 17/22; G10L 13/02; G10L 17/06; G10L 2015/223; G10L 15/22; G06F 3/0481; G06F 3/167
See application file for complete search history.

(56) References Cited

U.S. PATENT DOCUMENTS

| 11,257,487 B2 | 2/2022 | Casado |
| 11,423,890 B2 | 8/2022 | Casado et al. |
| 11,914,923 B1 * | 2/2024 | Fotedar .................. G06F 3/167 |

(Continued)

FOREIGN PATENT DOCUMENTS

EP            3885938 A1 *  9/2021  .......... G06F 1/1626

*Primary Examiner* — Hai Phan
*Assistant Examiner* — Nathan Tengbumroong
(74) *Attorney, Agent, or Firm* — Gray Ice Higdon

(57) ABSTRACT

Implementations relate to an automated assistant that is responsive, without requiring an invocation phrase or other invocation input(s), to certain spoken utterances when certain display content is being accessed by a user. The display content can be processed to identify certain inputs and/or other intents and parameters that are associated with assistant operations and are relevant to the display content. Thereafter, the automated assistant can determine whether any spoken utterances from the user correspond to those certain inputs, intents, and/or parameters. In response to receiving such a spoken utterance, the automated assistant can initialize performance of the relevant operation without necessitating that the user provides a preceding invocation phrase or other invocation input(s). When other display content is being accessed, the automated assistant can repeat the process for other inputs and operations.

20 Claims, 6 Drawing Sheets

(56) References Cited

U.S. PATENT DOCUMENTS

| | | | |
|---|---|---|---|
| 2015/0142435 A1* | 5/2015 | Kumar P.V | G10L 15/26 704/235 |
| 2018/0342243 A1 | 11/2018 | VanBlon et al. | |
| 2020/0098362 A1* | 3/2020 | Piernot | G06F 3/167 |
| 2022/0301549 A1* | 9/2022 | Lee | G10L 15/08 |
| 2022/0308718 A1* | 9/2022 | Klein | G10L 15/08 |
| 2024/0020345 A1* | 1/2024 | Ulanov | G06F 16/9535 |

\* cited by examiner

NON-WAKE WORD INVOCATION OF AN AUTOMATED ASSISTANT FROM CERTAIN UTTERANCES RELATED TO DISPLAY CONTENT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

An automated assistant can be invoked through invocation phrases and/or wake words, which the automated assistant can listen for prior to performing certain processing of audio data that can capture any utterances, from a user, that precedes or follows the invocation phrase or wake word. For example, an automated assistant can first require detection of a wake word before performing automatic speech recognition (ASR) on such audio data and/or performing natural language understanding (NLU) on recognized text from the ASR. For instance, a user who is listening to music through an assistant-enabled device may provide a spoken utterance (e.g., "Assistant, stop.") with an invocation phrase such as, "Assistant," and a command such as, "stop," to cause the music to stop playing. Some automated assistants include additional or alternative invocation input(s), that must first be detected before causing certain processing of audio data to be performed. For example, some automated assistants can be invoked in response to user actuation of hardware and/or software buttons, in response to certain touch gesture(s), and/or in response to a prolonged gaze at an assistant device implementing the automated assistant.

However, in various circumstances, necessitating that the user provides an invocation input can prolong the interaction between the user and the automated assistant and/or can result in the automated assistant continuing to wastefully render ongoing content, such as audio content. For example, when the automated assistant is performing a text-to-speech (TTS) operation, such as reading steps of a recipe, the user may not be able to provide any spoken input (or only very limited certain input), that is processed by the automated assistant, without first providing an invocation phrase. For instance, if TTS output describing ingredients of the recipe is being audibly rendered by the automated assistant, it may only be interrupted if a user first speaks an invocation phrase or first provides another invocation input. As a result, rendering of the TTS output is prolonged for at least the duration of provision of the invocation input. Further, completing the recipe (or other task that the automated assistant is assisting with) can be inefficiently prolonged. Moreover, necessitating that the automated assistant continually detect invocation phrases in all circumstances can add, to certain assistant interactions, seemingly wasteful requirements that may unnecessarily consume resources in those circumstances.

SUMMARY

Implementations set forth herein relate to an automated assistant that is responsive to a predetermined set of words and/or phrases that are dynamically updated according to display content that is currently being rendered but that may not be selectable (e.g., may not be stored with an executable link and/or may not be selectable through interaction with the display via which the display content is rendered). Furthermore, when a spoken utterance includes a word or phrase from the predetermined set of words and/or phrases, the predetermined set of words and/or phrases may not need to be preceded by an invocation phrase and/or any other invocation input(s) to cause the automated assistant to respond to a spoken utterance. The implementations set forth herein are distinguished from some automated assistants that may be responsive to certain utterances that are void of an invocation phrase.

As one example, an automated assistant may have the ability to respond to a word or phrase (e.g., "stop"), without an invocation phrase (e.g., "Assistant . . . ") during execution of certain operations (e.g., when an alarm is audibly going off). However, in such instances, the spoken utterance from the user must expressly include the word or phrase that the automated assistant has been preconfigured to respond to during the execution of such operations. This is distinguished from the implementations herein, which may not require a user to provide an exclusive word or phrase to invoke the automated assistant to perform an operation. Rather, the implementations set forth herein allow for the user to, in certain circumstances, provide a range of invocation-free utterances (e.g., a spoken utterance that does not include a blanket invocation phrase) to cause one or more different operations to be performed by the automated assistant.

As another example, an automated assistant may have the ability to respond to an invocation-free utterance that proceeds a separate utterance that included an invocation phrase, thereby allowing the automated assistant to temporarily "drop" any requisite for an invocation phrase before executing a command. For example, a user can provide an initial spoken utterance such as, "Assistant, what's the weather today?" to cause the automated assistant to provide an audible weather report for the day. Afterwards, and within a threshold period of time, the user can provide a follow-up input such as, "How about tomorrow?" to cause the automated assistant to provide another weather report for the following day. This is distinguished from the implementations herein, which may not require the user to have provided an invocation phrase within a threshold period of time of providing a word or phrase that is actionable by the automated assistant. Rather, the implementations set forth herein allow the automated assistant to determine whether features of utterances provided by a user correspond to a dynamically updated set of input data that may relate to content being accessed by the user. In some implementations, the content that is being accessed by the user may not necessarily include selectable elements that embody actionable links.

For example, and in some implementations, a user can be viewing a web page and/or other application interface that includes graphical and/or textual content. For instance, the content can be an encyclopedia page related to a musical artist. As the user scrolls through content, the automated assistant can determine, with prior permission from the user, that the content relates to one or more operations capable of being initialized by the automated assistant. However, although the web page and/or application interface may include selectable elements, the selectable element may not control any of the one or more operations. For example, when the content of the encyclopedia page relates to a musical artist, the automated assistant can determine that an intent (e.g., "play( )") for initializing music playback may be related to the content and/or that one or more parameters (e.g., "War Paint" for executing "play(bandName: 'War Paint'))" may be related to the content. Alternatively, or additionally, the automated assistant can determine a set of input data characterizing one or more inputs related to the content and/or one or more operations related to the content. When an input from the input data (e.g., an utterance such as "Let's hear this," "Play this," "Jam to this," etc.) is provided to the automated assistant, the automated assistant can initialize performance of a particular operation (e.g., execute an intent play(bandName: 'War Paint')) identified by the input data without the input being preceded by an invocation phrase.

In some implementations, as the user continues to scroll through the content and/or otherwise causes other content to be rendered at the display interface of the computing device, the set of input data can be dynamically updated. In this way, inputs that would not have previously invoked the automated assistant can then be used to invoke the automated assistant, and, optionally, other inputs that would have previously invoked the automated assistant (e.g., "Play this.") may no longer invoke the automated assistant. For example, as the user continues to scroll the encyclopedia page, additional content can be rendered and may identify a person who operates a store nearby—the address of which can be indicated in the additional content. Based on this additional content, the automated assistant can determine another set of input data that can indicate other operations that are related to the additional content and are capable of being performed by the automated assistant. For example, the automated assistant can determine that an intent (e.g., "navigate( )) for providing directions to an address may be related to the additional content, and/or that one or more parameters (e.g., "The Brick House, Louisville" for executing "navigate(address: 'The Brick House, Louisville')") may be related to the content. When an additional input from the other set of input data (e.g., such as "Navigate there," "How close is that," "Show me direction," etc.) is provided to the automated assistant, the automated assistant can initialize performance of a separate operation (e.g., execute an intent navigate(address: 'The Brick House, Louisville')") identified by the input data without the additional input being preceded by an invocation phrase.

In other words, and in accordance with the aforementioned example, the user can scroll to a portion of the encyclopedia page that includes content related to a musical artist (e.g., "War Paint") and provide a spoken utterance such as, "Play this," (without an invocation phrase) to cause the automated assistant to execute an intent such as, "play (bandName: 'War Paint'))." Furthermore, and as the user continues to scroll to another portion of the encyclopedia page that includes the address of a store, the user can optionally provide another spoken utterance such as, "Show me directions," to cause the automated assistant to execute another intent such as, "navigate(address: 'The Brick House, Louisville')" for showing directions to the store.

In some implementations, the automated assistant can facilitate generating each set of input data using one or more heuristic processes and/or one or more trained machine learning models. For example, content of an interface being accessed at a computing device can be processed, with prior permission from the user, to determine whether the content relates to one or more operations capable of being initialized by the automated assistant. The content can be processed to generate one or more embeddings that can be mapped to a latent space, which can include other embeddings associated with operations capable of being performed by the automated assistant. When a generated embedding is determined to be within a threshold distance in latent space to another embedding corresponding to a particular operation, that particular operation can be subject to input data generated by the automated assistant. The input data can then characterize a variety of different terms, intents, and/or parameters that, when identified in a user input to the automated assistant, can cause the automated assistant to initialize performance of the particular operation, without necessitating that the user input be preceded by an invocation phrase. When the input data has been generated, and optionally for a threshold duration of time from the content being accessed, the automated assistant can determine whether any inputs from the user correspond to the one or more intents, parameters, and/or other natural language inputs characterized by the input data. When the user is determined to have provided such an input, the automated assistant can then initialize performance of the particular operation.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
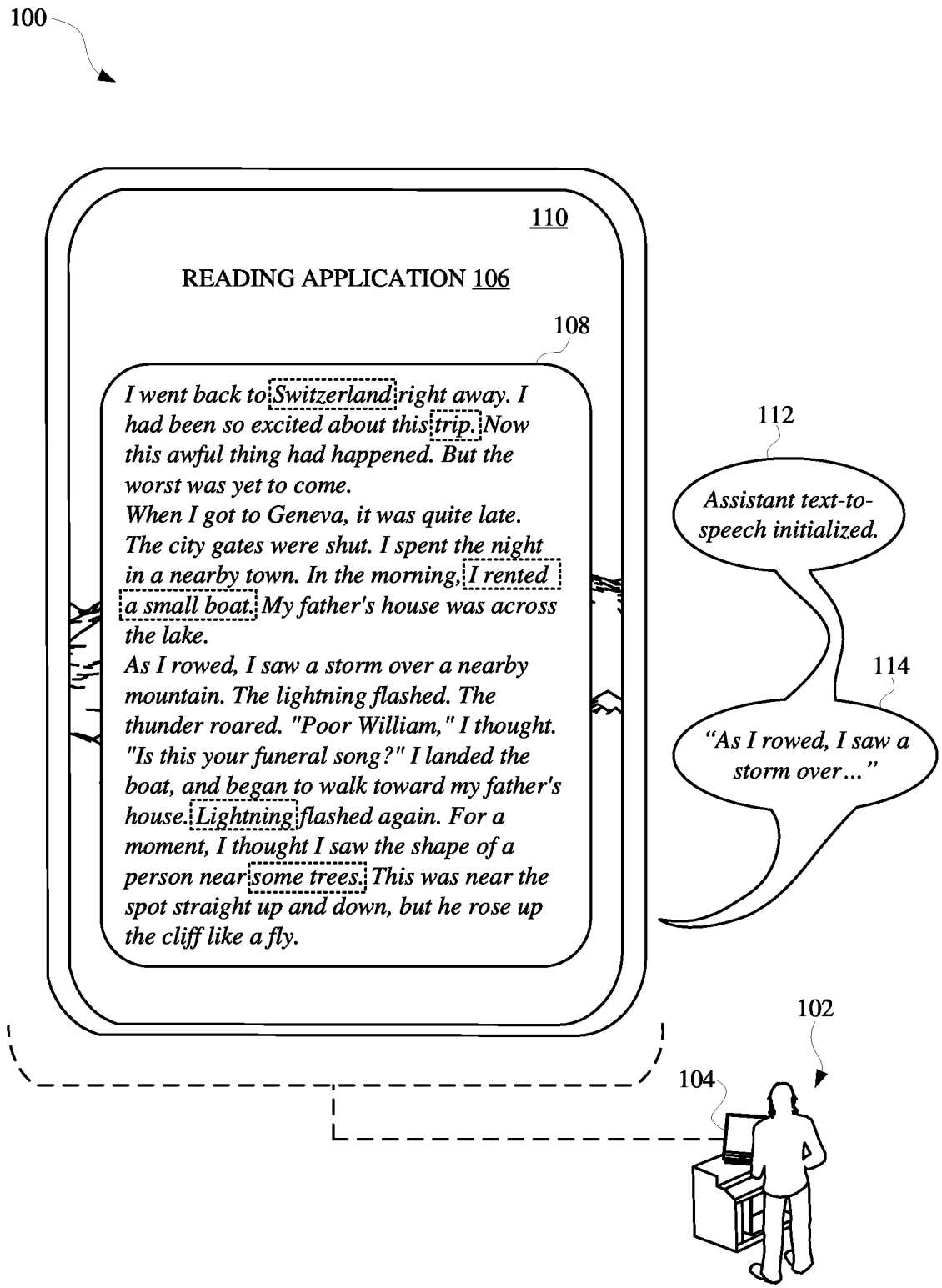
FIG. 1A, FIG. 1B, and FIG. 1C illustrate views of a user interacting with an automated assistant to cause the automated assistant to perform certain operations that the automated assistant has identified using content of an interface.
Figure 1B:
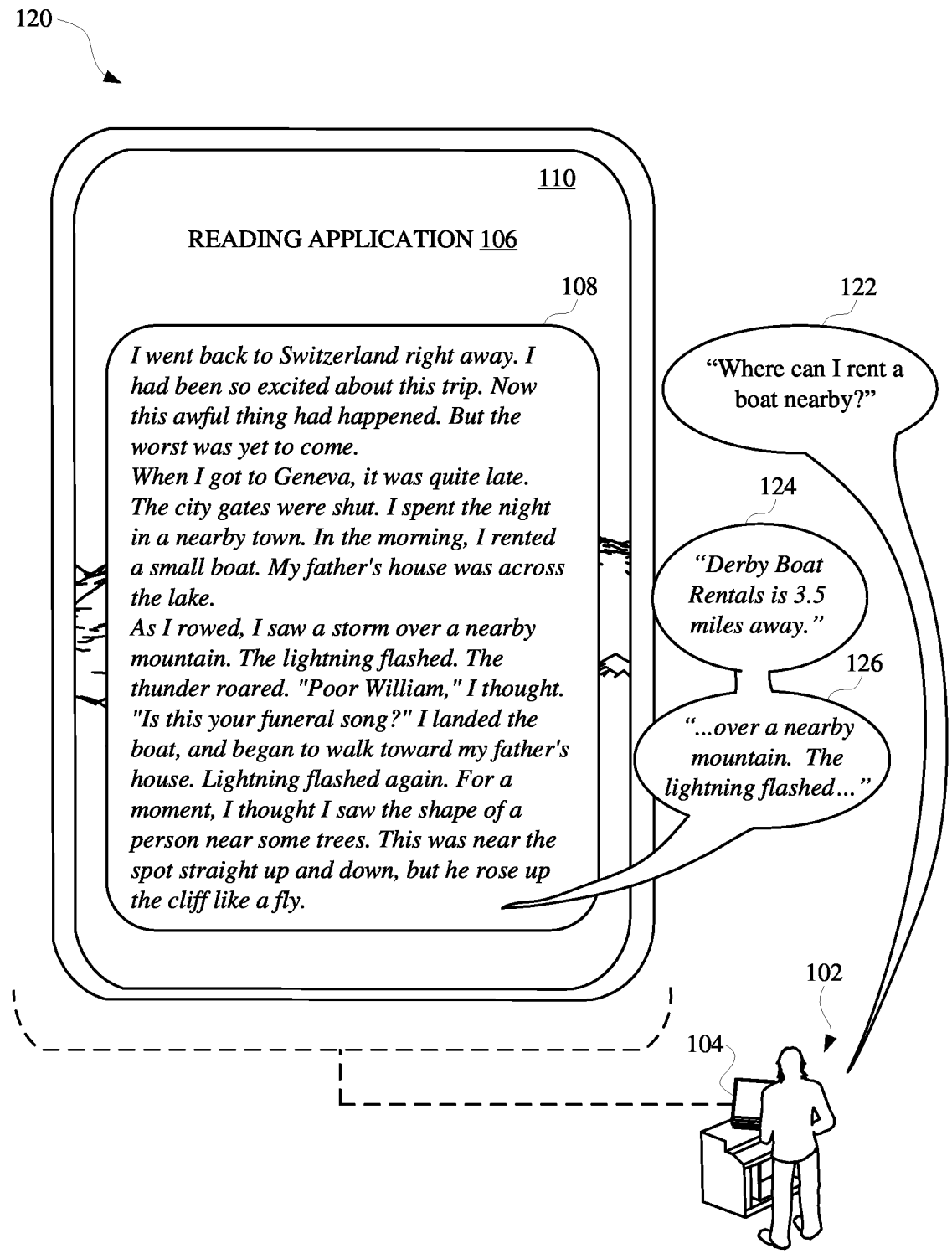
Figure 1C:
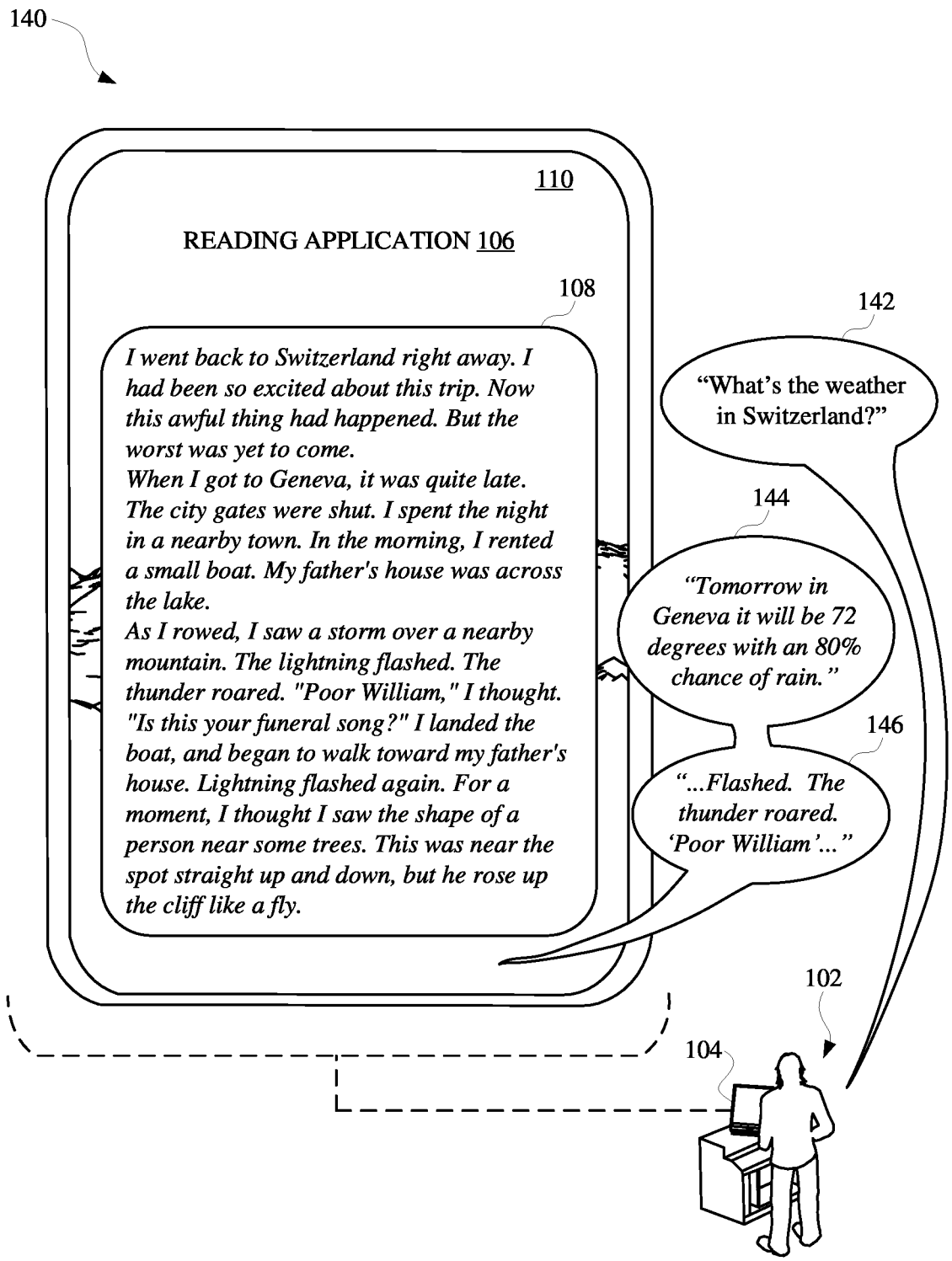

FIG. 1A, FIG. 1B, and FIG. 1C illustrate a view 100, a view 120, and a view 140 of a user 102 interacting with an automated assistant to cause the automated assistant to perform certain operations that the automated assistant has identified using content of an interface 110. The user 102 can cause the automated assistant to initialize performance of the operations without invoking the automated assistant with an invocation phrase (e.g., "Assistant . . . ") and/or other generally accepted assistant-invoking input (e.g., pressing a button). For example, the user 102 can be viewing a reading application 106 via a computing device 104, and the reading application 106 can be rendering one or more display elements 108. A display element 108 can include natural language content and/or images for conveying information to the user 102. For example, and as illustrated in FIG. 1A, the user 102 can be viewing a display element 108 that includes textual content of a book. As the user 102 is viewing the display element 108, and with prior permission from the user 102, the automated assistant can process interface data characterizing the content of the display interface 110 (e.g., the text of the display element 108). The interface data can be processed to determine whether any of the content relates to any operations that can be initialized and/or performed by the automated assistant. For example, the interface data can be processed to identify words and/or phrases that may be related to a command that can be provided by the user 102 to the automated assistant to cause the automated assistant to perform one or more operations associated with the content. Alternatively, or additionally, the interface data can be processed to identify intents and/or parameters that can be processed by the automated assistant and/or another application to initialize performance of one or more operations associated with the content.

For example, the automated assistant can employ one or more heuristic processes and/or one or more trained machine learning models to determine input data. The input data can characterize intents, parameters, and/or inputs that can be processed by the automated assistant to cause the automated assistant to perform one or more operations associated with the content of the display interface 110. The processing of interface data characterizing the content of the display interface 110 can result in an intent and/or parameters such as, "search("boat rentals," [near me])" and/or a command such as "Weather in Geneva?" The intent and parameter "search("boat rentals," [near me])" can correspond to a first operation for searching the internet to find locations near the user 102 that may be relevant to the search query "boat rentals." The command, "Weather in Geneva?" can correspond to a second operation for the automated assistant to provide a weather report for the current date for the location "Geneva." The selection of these intents, parameters, and/or inputs can be based on features of the content of the display interface 110 and/or the display element 108 such as, the text within the dotted-line boxes of FIG. 1A (e.g., "Switzerland," "trip," "I rented a small boat," "Lightning," and "some trees"). In some implementations, the text can be processed to identify certain portions of text that are most relevant to certain intents, parameters, and/or potential user inputs. The portions of text, as well as the intents, parameters, and/or inputs can then be further processed to identify other inputs that can be provided by the user 102 to initialize performance of the first operation and/or the second operation, which have been determined to be associated with the interface data.

For example, the automated assistant can identify one or more words or phrases that, when provided by the user 102 while the user 102 is viewing the display element 108, can cause the automated assistant to execute the first operation. The one or more words or phrases can include "Search for boat rentals," "Where can I rent a boat nearby," "Find a boat rental," and/or any other words or phrases that can be associated with the first operation. The automated assistant can then determine whether the user has provided a spoken utterance that includes the one or more words or phrases, without initially detecting an invocation phrase and/or other assistant-invoking input that might otherwise be required by the automated assistant in other circumstances. As illustrated in FIG. 1B, when the user 102 provides a particular spoken utterance 122 (e.g., "Where can I rent a boat nearby?"), the automated assistant can determine that the spoken utterance 122 corresponds to the first operation associated with the content of the display element 108. In response, the automated assistant can initialize performance of the first operation and render an output 124 such as, "Derby Boat rentals is 3.5 miles away." In some implementations, the automated assistant can be performing a TTS operation when the user 102 provides the spoken utterance 122, causing the automated assistant to temporarily pause the TTS operation and resume providing TTS output 126 after responding to the spoken utterance 122 (i.e., a first spoken utterance).

Similarly, and as the TTS operation is continually performed by the automated assistant, the user 102 can provide an additional spoken utterance 142 (i.e., a second spoken utterance), as illustrated in view 140 of FIG. 1C. The additional spoken utterance 142 can be provided without an invocation phrase and can be detected by the automated assistant (e.g., via automatic speech recognition) during the ongoing TTS operation. The additional spoken utterance 142 can be, for example, "What's the weather in Switzerland?" and can be determined to correspond to the second operation identified by the automated assistant based on the content of the display element 108. The automated assistant can optionally determine, using voice recognition, that the user 102 who is viewing the content also provided the additional spoken utterance 142, and based on this determination, bypass hotword detection for a particular invocation phrase (e.g., "Ok Assistant . . . ") that may be required in other contexts. Therefore, the automated assistant can initialize performance of the second operation to cause the automated assistant to provide another output 144 such as, "Tomorrow in Geneva it will be 72 degrees with an 80% chance of rain." When the second operation is rendered, the automated assistant can then continue the TTS operation by providing further output 146.

Figure 2:
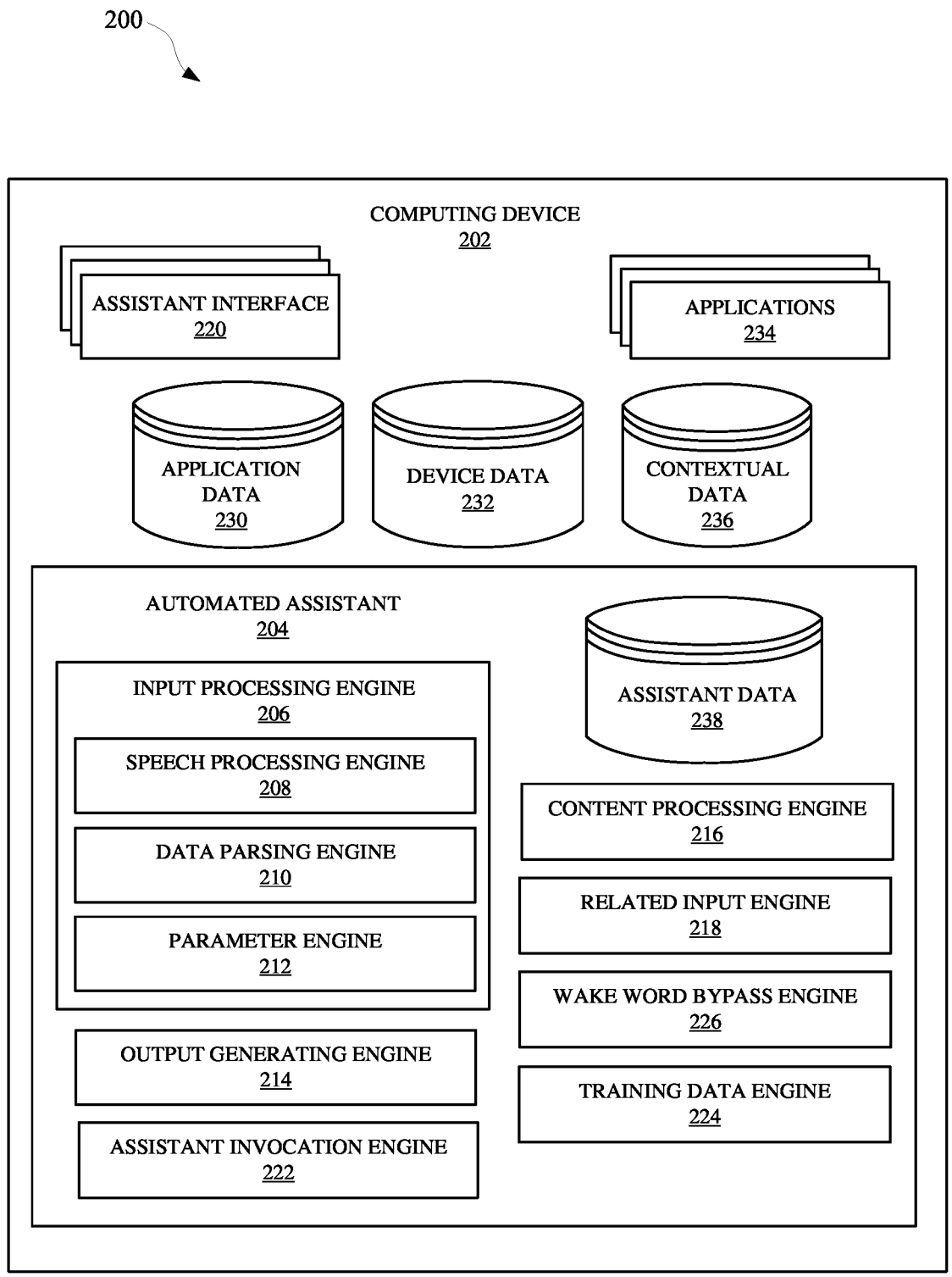
FIG. 2 illustrates a system for providing an automated assistant that is responsive, without requiring an invocation phrase or other wake word, to certain spoken utterances when certain display content is being accessed by a user.

FIG. 2 illustrates a system 200 for providing an automated assistant 204 that is responsive, without requiring an invocation phrase or other wake word, to certain spoken utterances when certain display content is being accessed by a user. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a content processing engine 216 that can, with prior permission from the user, process content that the user may be accessing via the computing device 202, or another computing device. The content can be embodied in data such as text, images, video, audio, and/or any other modality for conveying content to a user. In some implementations, content data can be processed by the content processing engine 216 using one or more heuristic processes and/or one or more trained machine learning models. For example, the content data can be processed alone or in combination with other data available to the system 200 (e.g., application data 230, device data 232, contextual data 236, and/or assistant data 238) to generate one or more embeddings that can be mapped to a latent space. The latent space can include operation embeddings corresponding to operations that can be initialized by the automated assistant and/or a separate application. When an embedding generated based on the content data is mapped to the latent space and determined to be within a threshold distance of a particular operation embedding, a particular operation corresponding to the particular operation embedding can be identified. One or more operations can be identified for the content data and the content processing engine 216 can indicate the one or more operations to a related input engine 218 of the system 200.

The related input engine 218 can determine, based on operations identified by the content processing engine 216, inputs, parameters, and/or intents that can be executed by the automated assistant to cause a particular operation of the identified operations to be performed. For example, a particular operation can be initialized by executing and/or processing a variety of different inputs, such as spoken utterances that may be somewhat different from each other but may be directed to initializing the same operation. Alternatively, or additionally, the particular operation can be initialized by executing and/or processing a variety of different intents and/or parameters that may be executable by the automated assistant and/or another application. For example, a user that is scrolling through a social media page may eventually access content related to a live musical performance nearby. Various operations can be determined associated with the content, such as searching for nearby musical venues, playing music through a smart speaker, and/or shopping for a musical instrument. The operation of searching for nearby musical venues can be initialized in response to a variety of spoken user inputs such as, "Search for music venues," "Where is the nearest music venue," and/or "Find nearby concerts." Alternatively, or additionally, the operation can be initialized by executing certain intents and/or parameters such as, "searchMap('music venue')", "searchWeb('nearby concerts')", and/or musicApp(search( ) "nearby")). In some implementations, the related input engine 218 can determine that a particular input corresponds to a particular intent and/or parameter using NLU processing, and generate input data that identifies the particular input. Alternatively, or additionally, the related input engine 218 can determine that one or more words or phrases correspond to the particular intent and/or parameter using NLU processing, and generate input data that identifies the one or more words or phrases. This input data can then be shared with a wake work bypass engine 226 for determining inputs that the automated assistant 204 can respond to without requiring a wake word and/or invocation phrase to precede the inputs.

For example, the wake word bypass engine 226 can operate to determine whether the user has provided any input corresponding to those identified in the input data. The input can be a spoken utterance and the input data can characterize words, phrases, intents, and/or parameters corresponding to operations that the automated assistant 204 determined are associated with the content being accessed by the user. The wake word bypass engine 226 can operate with the input processing engine 206 to determine whether a spoken utterance that has been provided by the user, without a wake word and/or invocation phrase, should be responded to by the automated assistant 204. In some implementations, this determination can be based on a determined degree of relevance and/or a degree of similarity of natural language content of a spoken utterance to a portion of the input data that corresponds to a particular operation. For example, NLU processing of a spoken input, with prior permission from the user, can be utilized to generate a relevance metric for a similarity between a spoken input and any words, phrases, intents, and/or parameters associated with an operation identified in the input data. The relevance metric can then be compared to a threshold for determining whether the relevance metric satisfies the threshold or not. When the threshold is satisfied, the automated assistant 204 can initialize performance of the operation that the spoken input is determined to be most relevant to.

In some implementations, the automated assistant 204 may only initialize performance of the operation when the user that provided the spoken utterance is the same user that is accessing the display content. Alternatively, or additionally, the automated assistant 204 may only initialize performance of the operation when the user is accessing the display content, and not when the display content is not longer being accessed by the user (e.g., the user has scrolled past the display content to view other display content). Alternatively, or additionally, the automated assistant 204 may only initialize performance of the operation if the spoken utterance is received within a threshold duration of time of a most recent instance when the user provided a prior spoken utterance. In this way, if the user has not invoked the automated assistant 204 for a threshold duration of time, the automated assistant 204 may not respond to the user with any spoken input being preceded by an invocation phrase and/or wake word. Alternatively, or additionally, the automated assistant 204 may only initialize performance of the operation if the spoken utterance is received within a threshold duration of time of the user accessing the display content. In this way, the automated assistant 204 can preserve computational resources by shifting from detecting certain words or phrases associated with certain operations relevant to the display content, to detecting a particular wake word and/or invocation phrase.

Figure 3:
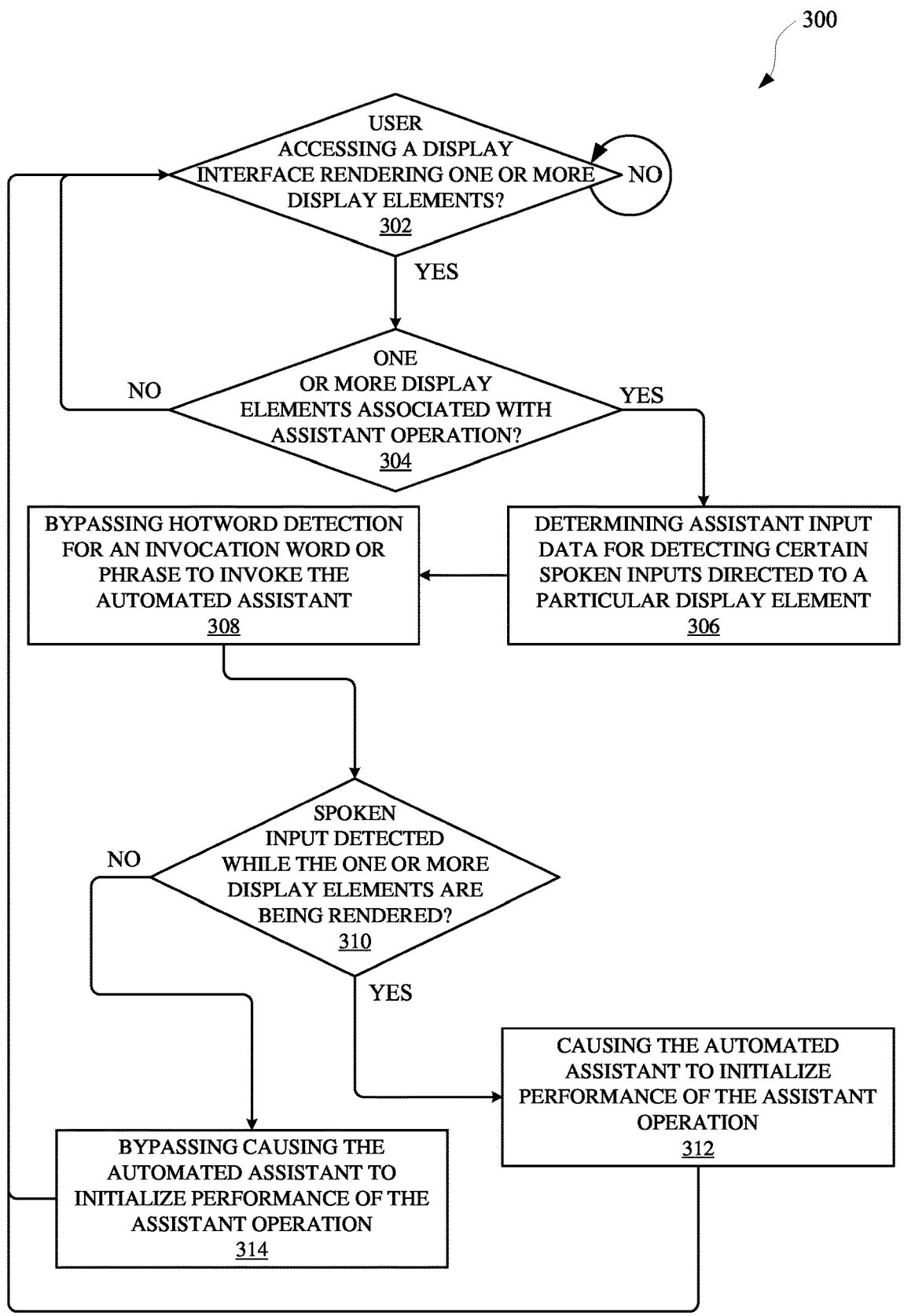
FIG. 3 illustrates a method for causing an automated assistant to be responsive to certain spoken inputs, without a preceding invocation phrase, when certain content is being rendered at a display interface.

FIG. 3 illustrates a method 300 for causing an automated assistant to be responsive to certain spoken inputs, without a preceding invocation phrase, when certain content is being rendered at a display interface. The method 300 can be performed by one or more computing devices, applications, and/or any other apparatus or module that can be associated with an automated assistant. The method 300 can include an operation 302 of determining whether a user is accessing a display interface that is rendering one or display elements. The automated assistant can determine that the display interface is rendering the one or more display elements, with prior permission from the user, by processing a screenshot of the display interface, interacting with an additional application that is rendering the display elements, interfacing with an operating system of the computing device, and/or any other process for determining screen content. Alternatively, or additionally, the automated assistant can determine that a particular user is accessing the one or more display elements based on historical interaction data that can indicate a previous and/or current device that a user is accessing, and/or a device that the user is anticipated to access in the future. For example, the automated assistant can determine that the user is accessing a particular computing device based on the user having recently accessed the automated assistant via the particular computing device, and/or being detected (with prior permission from the user) proximate to the particular computing device.

When a user is determined to be accessing the display interface that is rendering the one or more display elements, the method 300 can proceed from the operation 302 to an operation 304. Otherwise, the automated assistant may continue to determine whether the user is accessing any display interface, with prior permission from the user. The operation 304 can include determining whether the one or more display elements are associated with an assistant operation and/or other action capable of being controlled and/or initialized by the automated assistant. For example, natural language content of the one or more display elements can be processed to determine whether the natural language content relates to an intent and/or intent parameter that can be used by the automated assistant to initialize performance of an operation. Alternatively, or additionally, the natural language content can be processed to determine whether the natural language content relates to any natural language inputs that can be provided to the automated assistant to initialize performance of an operation.

As an example, the automated assistant can determine that the user is viewing a home repair blog via a blog application, and the user can be viewing a particular page of the home repair blog that discusses maintaining HVAC units. Text of the particular page can include portions of text that, when selected by the user without employing the automated assistant, may not cause the blog application to perform any operation. Rather, selecting certain portions of the text may cause an operating system to highlight the text and/or provide the user with an option to temporarily copy a selected portion of text into memory. Alternatively, or additionally, selecting certain portions of the text may cause the blog application to render options for actions that the blog application can take with the portion of text (e.g., perform a web search with the portion of the text, draft a comment directed to the portion of text, etc.). However, the blog application may not perform any of the actions until the user provides another direct input to the blog application.

Rather, the text of the particular page of the blog application can include suggestions for best practices when operating an HVAC unit, such as turning on geofencing and/or keeping your thermostat set to "72." These text excerpts can be associated with operations capable of being initialized by the automated assistant, such as an operation of controlling a thermostat application to turn on a geofencing setting and/or to adjust a temperature setting to "72." When the one or more display elements are determined to be associated with an assistant operation, the method 300 can proceed from the operation 304 to an operation 306 of determining assistant input data for detecting certain spoken inputs associated with certain display content. For example, the assistant input data can characterize one or more intents, intent parameters, natural language terms, and/or other inputs that can be processed by the automated assistant to initialize performance of one or more operations associated with the content being accessed by the user. In accordance with the aforementioned example, the assistant input data can identify an intent of "geoFence(on)," which can be executed to cause a geofencing setting of a thermostat to be turned on. Alternatively, or additionally, the assistant input data can identify a phrase such as, "Turn on geofencing," that can be a request for the automated assistant to cause the geofencing setting of the thermostat to be turned on.

In some implementations, the assistant input data can be generated to provide a correspondence between (1) operation embeddings mapped in latent space that correspond to certain executable operations, and (2) inputs that the user can provide. In this way, various different inputs can be processed to identify input embeddings that can be mapped to the latent space for determining whether the input embeddings are within a threshold distance in latent space to the operation embeddings. Furthermore, a corresponding operation can be initialized in certain contexts without requiring the user to provide a preceding invocation phrase. For example, the method 300 can proceed from the operation 306 to an operation 308 of bypassing hotword detection for a predetermined invocation word or phrase (e.g., "Assistant . . . ") to invoke the automated assistant. In some implementations, hotword detection can include using one or more trained machine learning models to detect the presence of a particular word or phrase in audio detected by one or more devices. Because the user is accessing content that may not be directly linked to the automated assistant without further processing, but that may be related to certain assistant operations, the automated assistant may bypass requiring a particular invocation word phrase before responding to inputs (e.g., one or more spoken inputs) associated with those assistant operations. However, although hotword detection may be bypassed for a particular predetermined invocation phrase, automatic speech recognition (ASR) may still be utilized to detect the input(s) associated with those assistant operations.

The method 300 can proceed from the operation 308 to an operation 310 of determining whether a certain spoken input corresponding to the assistant input data has been detected while the one or more display elements are being rendered at the display interface. For example, the user can provide a spoken utterance such as, "Turn on geofencing," which can be an input indicated by the assistant input data and/or an input that corresponds to an intent and/or parameter indicated by the assistant input data. In some implementations, natural language understanding (NLU) processing can be performed on audio data embodying the spoken utterance, without requiring hotword detection for an invocation phrase directly preceding the spoken utterance. The NLU processing can be utilized to determine that the spoken input relates to an operation determined to be related to a portion of text being rendered by the blog application. In response, the method 300 can proceed from the operation 310 to an operation 312 of causing the automated assistant to initialize performance of the assistant operation (e.g., turning on geofencing for the thermostat). Otherwise, if a result of the NLU processing indicates that the spoken input is not related to any portion of the text being rendered by the blog application and/or not related to any of the input data (e.g., not related to a threshold degree), the method 300 can proceed from the operation 310 to an operation 314. The operation 314 can include skipping or otherwise not initializing performance of the assistant operation.

Figure 4:
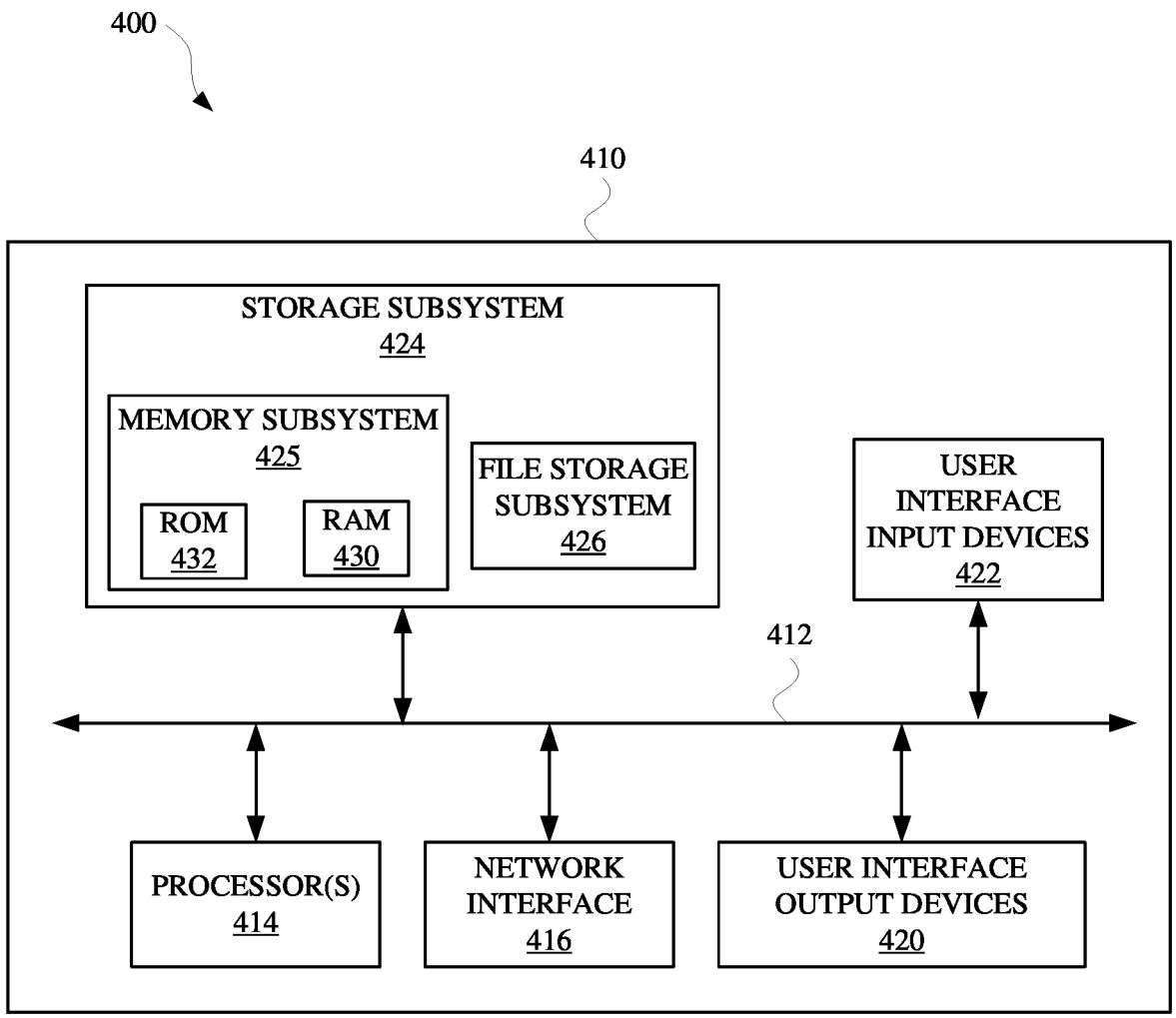
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, by an automated assistant, that a user has invoked the automated assistant with a first spoken utterance that includes an invocation phrase and that includes a request for the automated assistant to initialize performance of one or more operations, wherein the user invokes the automated assistant via a computing device that includes a display interface. The method can further include determining, by the automated assistant, that one or more display elements are being rendered at the display interface of the computing device, wherein the one or more display elements are associated with the one or more operations that can be initialized by the automated assistant. The method can further include determining, based on the one or more display elements, assistant input data that indicates one or more spoken inputs, wherein in response to at least one spoken input of the one or more spoken inputs being detected by the automated assistant while the one or more display elements are being rendered at the display interface and without the user providing an additional invocation phrase subsequent to the first spoken utterance, the automated assistant initializes performance of a particular operation related to a particular display element of the one or more display elements. The method can further include determining, by the automated assistant and while the one or more display elements are being rendered at the display interface, that the user has provided a second spoken utterance that corresponds to a particular spoken input of the one or more spoken inputs. The method can further include causing, in response to determining that the user has provided the second spoken utterance that corresponds to the particular spoken input, the automated assistant to initialize performance of the particular operation corresponding to the particular display element of the one or more display elements.

In some implementations determining that the user has provided the second spoken utterance that corresponds to the particular spoken input of the one or more spoken inputs includes: determining that the user who provided the first spoken utterance is also the user who provided the second spoken utterance, wherein causing the automated assistant to initialize performance of the particular operation is based on the user providing both the first spoken utterance and the second spoken utterance. In some implementations, the method can further include causing, based on the assistant input data that indicates one or more spoken inputs, the automated assistant to detect whether any spoken input of the one or more spoken inputs has been provided by the user within a threshold duration of time of the user providing the first spoken utterance, wherein causing the automated assistant to initialize performance of the particular operation is based on the second spoken utterance being received within the threshold duration of time.

In some implementations, the method can further include causing, based on the assistant input data that indicates the one or more spoken inputs, the automated assistant to detect whether any spoken input of the one or more spoken inputs has been provided by the user within a threshold duration of time of the one or more display elements being rendered at the display interface of the computing device, wherein causing the automated assistant to initialize performance of the particular operation is based on the second spoken utterance being received within the threshold duration of time. In some implementations, the one or more display elements are rendered by an additional application that is separate from the automated assistant and do not cause, without employing the automated assistant, the additional application to perform the particular operation when the user selects the one or more display elements. In some implementations, the one or more operations initialized by the automated assistant in response to the first spoken utterance are at least partially performed using the additional application. In some implementations, the automated assistant otherwise bypasses initializing performance of the particular operation when the second spoken utterance is received while the computing device is not rendering the one or more display elements.

In other implementations, a method implemented by one or more processors is set forth as including operations such as determining, by an automated assistant, that one or more display elements are being rendered at a display interface of a computing device, wherein the one or more display elements are rendered by an additional application that is separate from the automated assistant and do not cause, without employing the automated assistant, the additional application to perform a particular operation when the user selects the one or more display elements. The method can further include determining, based on the one or more display elements, assistant input data that corresponds to one or more spoken inputs, wherein in response to at least one spoken input of the one or more spoken inputs being detected by the automated assistant while the one or more display elements are being rendered at the display interface and without the user providing a preceding invocation phrase, the automated assistant initializes performance of the particular operation that is related to a particular display element of the one or more display elements. The method can further include determining, by the automated assistant and while the one or more display elements are being rendered at the display interface, that a user has provided a spoken utterance that corresponds to a particular spoken input of the one or more spoken inputs. The method can further include causing, in response to determining that the user has provided the spoken utterance that corresponds to the particular spoken input, the automated assistant to initialize performance of the particular operation corresponding to the particular display element of the one or more display elements.

In some implementations, determining that the user has provided the spoken utterance that corresponds to the particular spoken input of the one or more spoken inputs includes: determining that the user who accessed the one or more display elements is also the user who provided the spoken utterance, wherein causing the automated assistant to initialize performance of the particular operation is based on the user accessing the one or more display elements and providing the spoken utterance. In some implementations, the method can further include causing, based on the assistant input data that indicates the one or more spoken inputs, the automated assistant to detect whether any spoken input of the one or more spoken inputs has been provided by the user within a threshold duration of time of the one or more display elements being rendered at the display interface of the computing device, wherein causing the automated assistant to initialize performance of the particular operation is based on the spoken utterance being received within the threshold duration of time. In some implementations, the particular operation initialized by the automated assistant in response to the spoken utterance is at least partially performed using the additional application. In some implementations, the automated assistant bypasses initializing performance of the particular operation when the spoken utterance is received while the computing device is no longer rendering the one or more display elements.

In yet other implementations, a system is set forth as including one or more processors, and memory storing instructions that, when executed by the one or more processors, cause the one or more processors to perform operations that include: determining, by an automated assistant, that a user has invoked the automated assistant with a first spoken utterance that includes an invocation phrase and a request for the automated assistant to initialize performance of one or more operations, wherein the user invokes the automated assistant via a computing device that includes a display interface. The operations can further include determining, by the automated assistant, that one or more display elements are being rendered at the display interface of the computing device, wherein the one or more display elements are associated with the one or more operations that can be initialized by the automated assistant. The operations can further include determining, based on the one or more display elements, assistant input data that indicates one or more spoken inputs, wherein in response to at least one spoken input of the one or more spoken inputs being detected by the automated assistant while the one or more display elements are being rendered at the display interface and without the user providing an additional invocation phrase subsequent to the first spoken utterance, the automated assistant initializes performance of a particular operation related to a particular display element of the one or more display elements. The operations can further include determining, by the automated assistant and while the one or more display elements are being rendered at the display interface, that the user has provided a second spoken utterance that corresponds to a particular spoken input of the one or more spoken inputs. The operations can further include causing, in response to determining that the user has provided the second spoken utterance that corresponds to the particular spoken input, the automated assistant to initialize performance of the particular operation corresponding to the particular display element of the one or more display elements.

In some implementations, determining that the user has provided the second spoken utterance that corresponds to the particular spoken input of the one or more spoken inputs includes: determining that the user who provided the first spoken utterance is also the user who provided the second spoken utterance, wherein causing the automated assistant to initialize performance of the particular operation is based on the user providing both the first spoken utterance and the second spoken utterance. In some implementations, the operations further include: causing, based on the assistant input data that indicates one or more spoken inputs, the automated assistant to detect whether any spoken input of the one or more spoken inputs has been provided by the user within a threshold duration of time of the user providing the first spoken utterance, wherein causing the automated assistant to initialize performance of the particular operation is based on the second spoken utterance being received within the threshold duration of time.

In some implementations, the operations can further include: causing, based on the assistant input data that indicates one or more spoken inputs, the automated assistant to detect whether any spoken input of the one or more spoken inputs has been provided by the user within a threshold duration of time of the one or more display elements being rendered at the display interface of the computing device, wherein causing the automated assistant to initialize performance of the particular operation is based on the second spoken utterance being received within the threshold duration of time. In some implementations, the one or more display elements are rendered by an additional application that is separate from the automated assistant and do not cause, without employing the automated assistant, the additional application to perform the particular operation when the user selects the one or more display elements. In some implementations, the one or more operations initialized by the automated assistant in response to the first spoken utterance are at least partially performed using the additional application. In some implementations, the automated assistant otherwise bypasses initializing performance of the particular operation when the spoken utterance is received while the computing device is not rendering the one or more display elements. In some implementations, wherein the one or more operations performed in response to the first spoken utterance include a text-to-speech (TTS) operation and the one or more display elements are rendered simultaneously with the automated assistant audibly rendering output according to the TTS operation.

We claim:

1. A method implemented by one or more processors, the method comprising:
    determining, by an automated assistant, that a user has invoked the automated assistant with a first spoken utterance that includes an invocation phrase and that includes a request for the automated assistant to initialize performance of one or more operations,
        wherein the user invokes the automated assistant via a computing device that includes a display interface;
    determining, by the automated assistant, that non-selectable display elements are being rendered at the display interface of the computing device,
        wherein the non-selectable display elements are rendered in response to initialization of one or more of the operations by the automated assistant;
    comparing the non-selectable display elements to one or more operations capable of being initialized by the automated assistant, wherein the comparing includes:
        generating, from the non-selectable elements rendered on the display interface, one or more embeddings which are mapped to a latent space, wherein the latent space includes other embeddings associated with operations capable of being performed by the automated assistant, and
        determining whether one or more of the embeddings generated from the non-selectable elements are within a threshold distance in the latent space to one or more of the other embeddings associated with the operations;
    based on the comparing, identifying a set of the non-selectable display elements that relate to one or more operations capable of being initialized by the automated assistant;
    based on the set of the non-selectable display elements, updating a dynamic set of one or more spoken inputs, wherein in response to at least one spoken input of the dynamic set of one or more spoken inputs being detected by the automated assistant while the non-selectable display elements are being rendered at the display interface and without the user providing an additional invocation phrase subsequent to the first spoken utterance, the automated assistant initializes performance of a particular operation related to a particular non-selectable display element of the non-selectable display elements;
    determining, that the user has provided a second spoken utterance that corresponds to a particular spoken input of the dynamic set of one or more spoken inputs; and
    causing, in response to determining that the user has provided the second spoken utterance that corresponds to the particular spoken input, the automated assistant to initialize performance of the particular operation corresponding to the particular display element of the non-selectable display elements.

2. The method of claim 1, wherein determining that the user has provided the second spoken utterance that corresponds to the particular spoken input of the dynamic set of one or more spoken inputs includes:
    determining that the user who provided the first spoken utterance is also the user who provided the second spoken utterance,
        wherein causing the automated assistant to initialize performance of the particular operation is based on the user providing both the first spoken utterance and the second spoken utterance.

3. The method of claim 1, further comprising:
    causing, based on the assistant input data that indicates the dynamic set of one or more spoken inputs, the automated assistant to detect whether any spoken input of the dynamic set of one or more spoken inputs has been provided by the user within a threshold duration of time of the user providing the first spoken utterance,
        wherein causing the automated assistant to initialize performance of the particular operation is based on the second spoken utterance being received within the threshold duration of time.

4. The method of claim 1, further comprising:
    causing, based on the assistant input data that indicates the dynamic set of one or more spoken inputs, the automated assistant to detect whether any spoken input of the dynamic set of one or more spoken inputs has been provided by the user within a threshold duration of time of the non-selectable display elements being rendered at the display interface of the computing device,
        wherein causing the automated assistant to initialize performance of the particular operation is based on the second spoken utterance being received within the threshold duration of time.

5. The method of claim 1, wherein the non-selectable display elements are rendered by an additional application that is separate from the automated assistant and do not cause, without employing the automated assistant, the additional application to perform the particular operation when the user selects the non-selectable display elements, wherein the one or more operations initialized by the automated assistant in response to the first spoken utterance are at least partially performed using the additional application.

6. The method of claim 1, wherein the automated assistant otherwise bypasses initializing performance of the particular operation when the second spoken utterance is received while the computing device is not rendering the non-selectable display elements.

7. A method implemented by one or more processors, the method comprising:
    determining, by an automated assistant, that non-selectable display elements are being rendered at a display interface of a computing device,
        wherein the non-selectable display elements are rendered by an additional application that is separate from the automated assistant and do not cause, without employing the automated assistant, the additional application to perform a particular operation when the user selects the non-selectable display elements;
    comparing the non-selectable display elements to one or more operations capable of being initialized by the automated assistant, wherein the comparing includes:
        generating, from the non-selectable elements rendered on the display interface, one or more embeddings which are mapped to a latent space, wherein the latent space includes other embeddings associated with operations capable of being performed by the automated assistant, and determining whether one or more of the embeddings generated from the non-selectable elements are within a threshold distance in the latent space to one or more of the other embeddings associated with the operations;

based on the comparing, identifying a set of the non-selectable display elements that relate to one or more operations capable of being initialized by the automated assistant, based on the set of the non-selectable display elements, updating a dynamic set of one or more spoken inputs, wherein in response to at least one spoken input of the dynamic set of one or more spoken inputs being detected by the automated assistant while the non-selectable display elements are being rendered at the display interface and without the user providing a preceding invocation phrase, the automated assistant initializes performance of the particular operation that is related to a particular non-selectable display element of the non-selectable display elements;

determining, that a user has provided a spoken utterance that corresponds to a particular spoken input of the dynamic set of one or more spoken inputs; and causing, in response to determining that the user has provided the spoken utterance that corresponds to the particular spoken input, the automated assistant to initialize performance of the particular operation corresponding to the particular display element of the non-selectable display elements.

8. The method of claim 7, wherein determining that the user has provided the spoken utterance that corresponds to the particular spoken input of the dynamic set of one or more spoken inputs includes:

determining that the user who accessed the non-selectable display elements is also the user who provided the spoken utterance, wherein causing the automated assistant to initialize performance of the particular operation is based on the user accessing the non-selectable display elements and providing the spoken utterance.

9. The method of claim 7, further comprising:

causing, based on the assistant input data that indicates the dynamic set of one or more spoken inputs, the automated assistant to detect whether any spoken input of the dynamic set of one or more spoken inputs has been provided by the user within a threshold duration of time of the non-selectable display elements being rendered at the display interface of the computing device, wherein causing the automated assistant to initialize performance of the particular operation is based on the spoken utterance being received within the threshold duration of time.

10. The method of claim 7, wherein the particular operation initialized by the automated assistant in response to the spoken utterance is at least partially performed using the additional application.

11. The method of claim 7, wherein the automated assistant bypasses initializing performance of the particular operation when the spoken utterance is received while the computing device is no longer rendering the non-selectable display elements.

12. A system, comprising:
one or more processors; and
memory storing instructions that, when executed by the one or more processors, cause the one or more processors to perform operations that include:

determining, by an automated assistant, that a user has invoked the automated assistant with a first spoken utterance that includes an invocation phrase and a request for the automated assistant to initialize performance of one or more operations, wherein the user invokes the automated assistant via a computing device that includes a display interface;

determining, by the automated assistant, that non-selectable display elements are being rendered at the display interface of the computing device, wherein the non-selectable display elements are rendered in response to initialization of one or more of the operations by the automated assistant;

comparing the non-selectable display elements to one or more operations capable of being initialized by the automated assistant, wherein the comparing includes:

generating, from the non-selectable elements rendered on the display interface, one or more embeddings which are mapped to a latent space, wherein the latent space includes other embeddings associated with operations capable of being performed by the automated assistant, and determining whether one or more of the embeddings generated from the non-selectable elements are within a threshold distance in the latent space to one or more of the other embeddings associated with the operations;

based on the comparing, identifying a set of the non-selectable display elements that relate to one or more operations capable of being initialized by the automated assistant;

based on the set of the non-selectable display elements, updating a dynamic set of one or more spoken inputs, wherein in response to at least one spoken input of the dynamic set of one or more spoken inputs being detected by the automated assistant while the non-selectable display elements are being rendered at the display interface and without the user providing an additional invocation phrase subsequent to the first spoken utterance, the automated assistant initializes performance of a particular operation related to a particular non-selectable element of the non-selectable display elements;

determining, that the user has provided a second spoken utterance that corresponds to a particular spoken input of the dynamic set of one or more spoken inputs; and causing, in response to determining that the user has provided the second spoken utterance that corresponds to the particular spoken input, the automated assistant to initialize performance of the particular operation corresponding to the particular display element of the non-selectable display elements.

13. The system of claim 12, wherein determining that the user has provided the second spoken utterance that corresponds to the particular spoken input of the dynamic set of one or more spoken inputs includes:

determining that the user who provided the first spoken utterance is also the user who provided the second spoken utterance, wherein causing the automated assistant to initialize performance of the particular operation is based on the user providing both the first spoken utterance and the second spoken utterance.

14. The system of claim 12, wherein the operations further include:
causing, based on the assistant input data that indicates the dynamic set of one or more spoken inputs, the automated assistant to detect whether any spoken input of the dynamic set of one or more spoken inputs has been provided by the user within a threshold duration of time of the user providing the first spoken utterance,
wherein causing the automated assistant to initialize performance of the particular operation is based on the second spoken utterance being received within the threshold duration of time.

15. The system of claim 12, wherein the operations further include:
causing, based on the assistant input data that indicates the dynamic set of one or more spoken inputs, the automated assistant to detect whether any spoken input of the dynamic set of one or more spoken inputs has been provided by the user within a threshold duration of time of the non-selectable display elements being rendered at the display interface of the computing device,
wherein causing the automated assistant to initialize performance of the particular operation is based on the second spoken utterance being received within the threshold duration of time.

16. The system of claim 12, wherein the non-selectable display elements are rendered by an additional application that is separate from the automated assistant and do not cause, without employing the automated assistant, the additional application to perform the particular operation when the user selects the non-selectable display elements.

17. The system of claim 16, wherein the one or more operations initialized by the automated assistant in response to the first spoken utterance are at least partially performed using the additional application.

18. The system of claim 12, wherein the automated assistant otherwise bypasses initializing performance of the particular operation when the spoken utterance is received while the computing device is not rendering the non-selectable display elements.

19. The method of claim 1, wherein the comparing includes generating, from the non-selectable elements rendered on the display interface, one or more embeddings which are mapped to a latent space.

20. The method of claim 19, wherein the latent space further includes other embeddings associated with operations capable of being performed by the automated assistant.

* * * * *